2,965,611

POLYPHENOL GLYCIDYL ETHERS

Carl G. Schwarzer, Walnut Creek, Calif., assignor to Shell Oil Company, New York, N.Y., a corporation of Delaware No Drawing. Filed Aug. 26, 1958, Ser. No. 757,221

12 Claims. (Cl. 260—47)

This invention relates to a new and improved class of epoxy ethers and to resins which may be prepared from them. More particularly, the invention relates to novel and useful polyglycidyl ethers of polyphenyl alkanes and to polymeric compositions thereof.

The epoxy resins of the art have heretofore generally been polyglycidyl ethers of such bisphenolic compounds as bisphenol itself or 2,2-bis(4-hydroxyphenyl)propane. Although the cured products of these epoxy resins are hard and strong at room temperature and are satisfactory for many applications, the hardness and strength of these products diminishes with increased temperature. I have found, however, that by employing polyglycidyl ethers of tris- and tetraphenolic alkenes, epoxy resins of improved high temperature characteristics may be obtained.

It is an object of my invention to provide new glycidyl ethers of polyphenyl alkanes. Another object of my invention is the provision of new cured resinous compositions comprising such glycidyl ethers of polyphenyl alkanes. Still another object is the provision of such cured resinous compositions having improved hardness and strength at elevated temperatures. Other objects will be apparent from the following description of the invention.

The new epoxy ethers of my invention are poly(epoxyalkoxyaryl)propanes having $n$ epoxyalkoxyaryl radicals, where $n$ is an integer from 3 to 4 and the internal carbon atom of the propane chain is substituted with two of the radicals. I have found that these ethers, when cured, yield resinous materials having excellent hardness and strength at elevated temperatures. These valuable properties render the new class of epoxy resins useful in such applications as surface coating, molding and laminating.

The new poly(epoxyalkoxyaryl)propanes of my invention are derived from a polyphenol which has two hydroxyaryl groups attached to the internal, or non-terminal, carbon atom of a propane chain and at least one hydroxyaryl group attached to a terminal carbon atom of the chain. Examples of such polyphenols include 1,2,2,3-tetrakis(hydroxyphenyl)propane; 1,2,2-tris(hydroxyphenyl)propane and such ring-substituted polyphenols as 1,2,2,3-tetrakis(2-hydroxy-5-methylphenyl)-propane; 1,2,2-tris(4-hydroxy-2,6-ditertiary butylphenyl)-propane; 1,2,2,3-tetrakis(3-ethyl-4-hydroxyphenyl)propane; 1,2,2,3-tetrakis(3-chloro-4-hydroxyphenyl)propane; 1,2,2-tris(2-hydroxynaphthyl)propane, and the like.

The polyphenols used in preparing the polyglycidyl ethers of my invention are prepared by the condensation of a hydroxyaryl compound, such as phenol, cresol, 2,6-ditert-butyl phenol or naphthol with a terminally halogenated ketone, such as mono- or dichloroacetone. The preferred reactants, because of their economy and ease of reactivity, are phenols and chloroacetones, either monochloroacetone or dichloroacetone, and the further description of the reaction will be expressed in terms of these compounds. It should be understood, however, that it is not intended to limit the preparation of the polyphenols to these reactants, and other hydroxyaryl and haloketone compounds will be operative in preparing the polyphenols.

I prefer to conduct the condensation with the aid of such acidic catalysts as mineral acids, organic carboxylic acids, solid acidic ion exchange resins, or the like. The reaction is preferably conducted by mixing the phenol and the chloroacetone together, using an amount of phenol substantially in excess of the stoichiometric proportions, adding a catalytic amount of acid as, for example, saturating the mixture with hydrogen chloride, and allowing the reaction to proceed. At the termination thereof, the unreacted phenol may readily be removed by such well-known methods as distillation. The phenols condense with the chloroacetone so that two hydrophenyl groups are linked to the non-terminal or internal carbonylic carbon atom, and each chlorine atom is replaced with a hydroxyphenyl group.

From these novel polyphenols the novel poly(epoxyalkoxyphenyl)propanes of my invention may readily be prepared by reaction with such epoxyalkyl halides as 1-chloro-3,4-epoxybutane; 1-bromo-4,5-epoxypentane; 1-iodo-5,6-epoxyhexane, as well as 1-bromo-2,3-epoxybutane; 1-chloro-3,4-epoxypentane; 1-iodo-4,5-epoxyhexane, etc. The epoxyalkyl ethers having terminal epoxy groups are preferred and are prepared from the polyphenols by reaction with epoxyalkyl halides having terminal epoxy groups

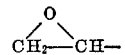

The most available, least expensive and most reactive of these terminal epoxyalkyl halides, epichlorohydrin is, for these reasons, the most preferred reactant in the preparation of my novel compounds, and their preparation will be described in terms thereof.

The poly(epoxyalkoxyphenyl)propanes of my invention may be prepared by adding the polyphenols whose preparation has been described to epoxyalkyl halides, using the latter in a ratio of about 2 to 10 moles per phenolic hydroxyl group of the polyphenol. An alkali metal hydroxide, such as sodium or potassium, is added to effect the desired etherification. Thus, when employing epichlorohydrin, it is convenient to dissolve the polyphenol in the substantial stoichiometric excess of the epichlorohydrin and heat the mixture to about reflux temperature. Aqueous sodium hydroxide, in about 15% to 50% concentration, may then be added gradually with the boiling of the reaction mixture. The water added with the base as well as that formed in the reaction may be azeotroped off with the epichlorohydrin, and the mixture separated with return of the epichlorohydrin as reflux.

It is desired to add the base and conduct the distillation at rates such that the reaction mixture contains at least 0.5% water in order to permit the etherification reactions to proceed at a reasonably rapid rate. The sodium hydroxide is preferably added in an amount equivalent on a stoichiometric basis to the quantity of starting polyphenol or a 3–5% excess thereof. On completion of the addition of the base and of the etherification reaction, unreacted epichlorohydrin may be distilled from the reaction mixture.

The residue consists mostly of the polyglycidyl ether and salt. The ether may readily be separated by dissolving it in a solvent in which the salt is insoluble, such as one consisting of equal volumes of toluene and butanone. From such a solvent, the salt may be easily separated by filtration, and the filtrate then distilled to remove the solvent and leave behind the product polyglycidyl ether.

These polyglycidyl ethers are light-colored solid epoxy resins at 25° C. Their structure will, of course, depend on the structure of the polyphenol from which they were prepared but in general they will have glycidyl radicals in place of the hydrogen atoms of most of the phenolic hydroxyl groups of the polyphenol. Thus, the completely etherified polyglycidyl ether of 1,2,2-tris(hydroxyphenyl)propane will have the structure:

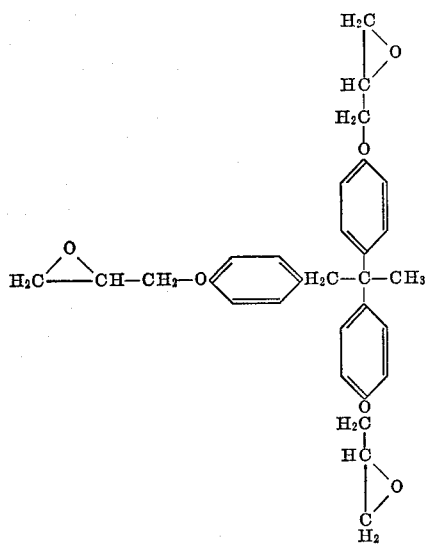

while the completely etherified polyglycidyl ether of the 1,2,2,3-tetrakis(hydroxyphenyl)propane will have the symmetrical structure

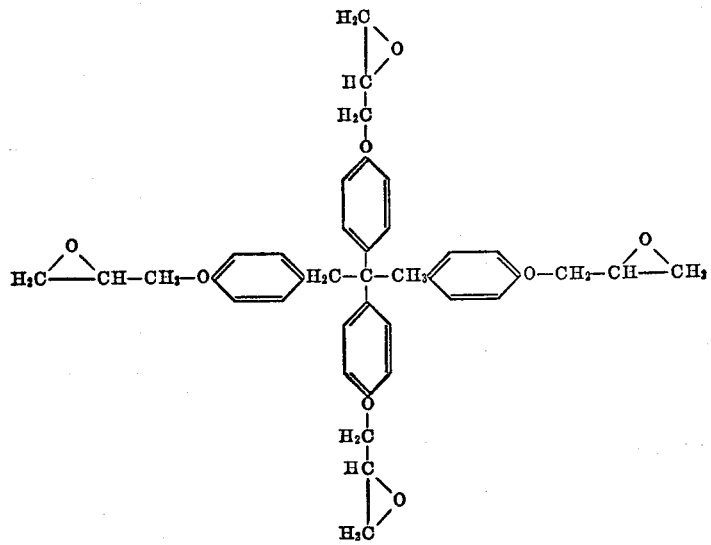

Other groups in the ether, besides a possible very small amount of unetherified phenolic hydroxyl groups, are dihydroxy glyceryl radicals and chlorohydroxy radicals which likewise are substituted in place of the hydrogen atoms of phenolic hydroxyl groups of the polyphenol.

The polyglycidyl ethers of the invention are generally soluble in lower aliphatic ketones as well as in mixtures of an aromatic hydrocarbon containing a substantial proportion of such lower ketone. Their solubility in hydrocarbons may be increased by using, in preparing the polyphenols, hydroxyaryl compounds having ring-substituted long-chain hydrocarbon substituents. For example, by condensing phenols having o-substituted saturated or unsaturated side chains of from 7 to 20 carbon atoms with haloacetones, and preparing the polyglycidyl ethers from the resulting polyphenols, useful oil-soluble polyglycidyl ethers may easily be prepared. By virtue of their multiplicity of epoxy groups which will react with acids, these compounds may be employed as corrosion inhibitors in lubricating or cutting oils.

Furthermore, the new epoxy resins of my invention are very useful materials for the preparation of resinous compositions. They undergo cure by heating to hard temperature-resistant products after addition thereto of customary epoxy resin curing agents such as dicyandiamide, mono- or poly-amines, polycarboxylic acids or anhydrides, etc. In using the polyglycidyl ethers in various applications, they may be mixed with a variety of other materials such as fillers, solvents including mono-epoxy compounds, pigments, plasticizers, and different resins, such as phenolic resins, urea resins and melamine resins.

*Example I*

Into a 12-liter kettle were poured 750 parts of dichloroacetone and 5,550 parts of phenol. The kettle was heated to 43° C. and HCl gas was bubbled into the reaction mixture which became yellow. The heat was then turned off and the reaction allowed to proceed with addition of HCl for two hours, at the end of which the reaction mixture was wine red in color. The gas was then turned off and the mixture allowed to cool. Excess phenol was removed from the kettle by distillation up to 150° C. at a pressure of 1–2 mm.

The cake was removed from the kettle, ground, washed with n-hexane and dried for 8 hours in a vacuum oven. In this way about 2,168 parts, or a 92% yield, of 1,2,2,3-tetrakis(4'-hydroxyphenyl)propane was obtained. Analysis of the material yielded the following data:

| | Total Hydroxyl, eq./100 g. | Total Acid (weak) eq./100 g. | Chlorine, Percent Weight | C | H | Molecular Weight |
|---|---|---|---|---|---|---|
| Calculated for $C_{27}H_{24}O_4$ | 0.972 | 0.972 | None | 78.6 | 5.8 | 412 |
| Found | 0.960 | 0.960 | <0.06 | 77.8 | 5.9 | 373 |

These data corresponded to a compound having the structure

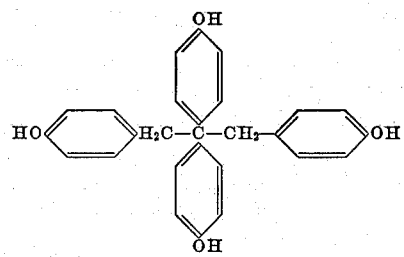

Example II

Using the method of the previous experiment, chloroacetone was reacted with a large excess of phenol. The resulting product, in 94% yield, was 1,2,2'-tris(hydroxyphenyl)propane which on analysis was found to yield the following data:

| Total Hydroxyl, eq./100 g. | Total Acidity, eq./100 g. | Chlorine, Percent Weight | Molecular Weight |
|---|---|---|---|
| 0.841 | 0.900 | 0.15 | 387 |

Example III

The tetraphenol prepared in Example I was converted to the tetraglycidyl ether in the following manner. The compound was dissolved in epichlorohydrin, the latter being in a 14:1 molar excess, and about 2-3% by weight of water was added to the mixture. The solution was heated vigorously with stirring, the kettle temperature being held at 100° C. at total reflux. When the temperature was constant at 100° C., an aqueous solution containing 46% by weight of potassium hydroxide was added dropwise until about 1-2% molar excess, based on the tetraphenol, had been added. The addition of aqueous caustic was made over about a two-hour period, at the end of which the water was azeotropically removed from the reaction mixture.

The reaction mixture was then cooled to remove the salt precipitated therein and the excess epichlorohydrin distilled under reduced pressure from the filtrate. The distillation was conducted up to a maximum kettle temperature of 170° C. at 1-2 mm. of mercury to assure removal of the epichlorohydrin and other volatile products.

The residue, obtained in 90% yield, was a light amber clear solid.

Example IV

The tetraglycidyl ether prepared in Example III was cured to a hard heat-resistant resinous solid. To do so, the ether was melted to a clear fluid as was a sample of meta-phenylenediamine. To the liquid tetraglycidyl ether was added 14% by weight of the diamine, and the resulting mixture was stirred thoroughly, cast into test-size samples and allowed to cure. The resulting solids were hard tough glossy materials. These solids were tested in comparison with cured samples of the glycidyl ether of 1,1,2,2-tetrakis(hydroxyphenyl)ethane.

The Barcol hardness of the resin samples was determined at a variety of temperatures. The results of these tests appear in the following table. The column headed "Resin A" displays the hardness of the cured polyglycidyl ethers of this invention; "Resin B" is the cured glycidyl ether of 1,1,2,2-tetrakis(hydroxyphenyl)ethane.

| Temperature, ° C. | Barcol Hardness | |
|---|---|---|
| | Resin A | Resin B |
| Room | 47 | 52 |
| 60 | 44 | 43 |
| 80 | 40 | 41 |
| 100 | 38 | 37 |
| 120 | 35 | 36 |
| 140 | 28 | 28 |
| 150 | 22 | 25 |

Furthermore, the heat distortion point of resin A was 257° C. in contrast to 205° C. for resin B.

Different cured samples of resin A and resin B were each boiled in water for three hours and in acetone for three hours. The weight change and hardness of these samples at the end of that time are shown in the following table:

| Sample | Barcol Hardness After 3 Hrs. | | | |
|---|---|---|---|---|
| | Boiling Water | Percent Wt. Change | Boiling Acetone | Percent Wt. Change |
| Resin A | 45 | 0.75 | 46 | 0 |
| Resin B | 52 | 0.83 | 52 | +0.05 |

Example V

A glass cloth laminate was prepared from the resin synthesized in Example I. An acetone solution containing 100 parts by weight of the resin and one part of a boron trifluoride-monoethylamine complex curing agent was used to impregnate a strip of 181 Volan A glass cloth. The cloth was dried for 10 minutes at 95° C., after which it was found to contain 37% of resin.

The strip was cut into pieces and 14 plies were stacked together. The resulting assembly was encased in cellophane and placed in a heated press having a temperature of about 155° C. The press platens were brought into contact pressure, about 3 p.s.i. (pounds per square inch) for 5 minutes and then a pressure of 25 p.s.i. was applied for 55 minutes. The product was a strong laminate, containing about 32% by weight of resin. This sample was designated sample A.

Another glass cloth laminate was prepared by impregnating a similar strip of glass cloth with an acetone solution containing 100 parts by weight of the resin prepared in Example I, 91 parts of methyl-substituted endomethylene tetrahydrophthalic anhydride, and 2 parts of benzyl dimethylamine. The strip so impregnated was cut into 14 pieces which were laid up while wet in cellophane. The package so prepared was worked thoroughly to remove air bubbles and excess resin, and then placed in a platen press heated to 135° C. The laminate was cured for one minute at contact pressure and for 59 minutes at 25 p.s.i. The resulting laminate contained 27% by weight of resin and was designated sample B.

The laminates so prepared had the following properties:

| Laminate | Ultimate Flexural Strength, p.s.i. × 10⁻⁴ | | | | |
|---|---|---|---|---|---|
| | 75° F. | 300° F. | 500° F. | After 200 Hrs. at 500° F. | |
| | | | | 500° F. | Wt. Loss, (%) |
| Sample A | 73 | 51 | 33 | 38 | 5.5 |
| Sample B | 60 | 57 | 29 | 11 | 10.9 |

I claim as my invention:

1. A poly[4-(epoxyalkoxy)aryl]propane having from 3 to 6 carbon atoms in the epoxyalkoxy radical and having $n$ epoxyalkoxyphenyl radicals where $n$ is an integer from 3 to 4 and the internal carbon atom of the propane chain is substituted with two of the said epoxyalkoxyphenyl radicals, the epoxy groups in the epoxyalkoxyphenyl radicals being in a terminal position.

2. 1,2,2,3 - tetrakis[4' - (epoxyalkoxy)aryl] propane wherein the epoxyalkoxy radical contains from 3 to 6 carbon atoms.

3. 1,2,2 - tris[4' - (epoxyalkoxy)aryl]propane wherein the epoxyalkoxy radical contains from 3 to 6 carbon atoms.

4. A poly (4-glycidyloxyphenyl)propane having $n$ glycidyloxyphenyl radicals where $n$ is an integer from 3 to 4 and the internal carbon atom of the propane chain is substituted with two of the said glycidyloxyphenyl radicals.

5. 1,2,2,3 - tetrakis(4' - glycidyloxyphenyl)propane.

6. 1,2,2 - tris(4' - glycidyloxyphenyl)propane.

7. A cured resinous composition consisting of polymerized poly[4 - (epoxyalkoxy)aryl]propane having from 3 to 6 carbon atoms in the epoxyalkoxy radical having $n$ epoxyalkoxyphenyl radicals where $n$ is an integer from 3 to 4 and the internal carbon atom of the propane chain is substituted with two of the said epoxyalkoxyphenyl radicals, the epoxy group in the epoxyalkoxyphenyl radicals being in a terminal position.

8. A cured resinous composition consisting of polymerized 1,2,2,3 - tetrakis[4' - epoxyalkoxy)aryl] propane wherein the epoxyalkoxy radical contains from 3 to 6 carbon atoms.

9. A cured resinous composition consisting of polymerized 1,2,2 - tris[4' - epoxyalkoxy)aryl]propane having from 3 to 6 carbon atoms in the epoxyalkoxy radical.

10. A cured resinous composition consisting of polymerized poly (4-glycidyloxyphenyl)propane having $n$ glycidyloxyphenyl radicals where $n$ is an integer from 3 to 4 and the internal carbon atom of the propane chain is substituted with two of the glycidyloxyphenyl radicals.

11. A cured resinous composition consisting of polymerized 1,2,2,3 - tetrakis(4' - glycidyloxyphenyl)propane.

12. A cured resinous composition consisting of polymerized 1,2,2 - tris(4' - glycidyloxyphenyl)propane.

References Cited in the file of this patent

UNITED STATES PATENTS

| | | |
|---|---|---|
| 2,806,016 | Schwarzer | Sept. 10, 1957 |
| 2,871,221 | Shepherd et al. | Jan. 27, 1959 |